No. 770,399. PATENTED SEPT. 20, 1904.
C. O. STRUTZ.
MANDREL FOR PIPE SHELLACKING MACHINES.
APPLICATION FILED FEB. 19, 1904.
NO MODEL.
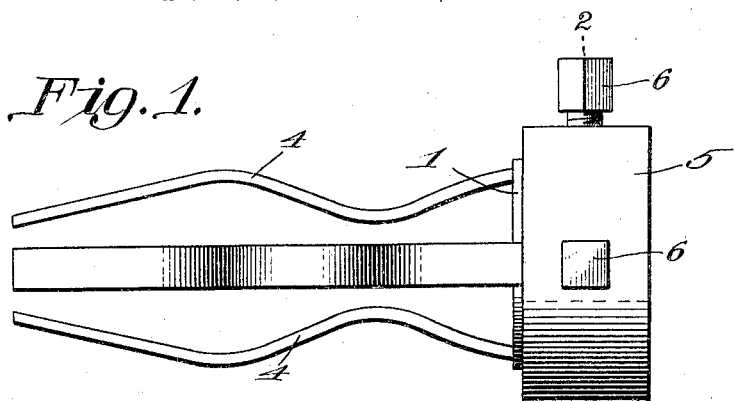
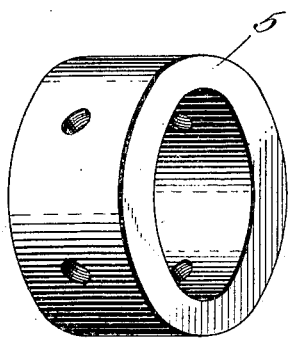
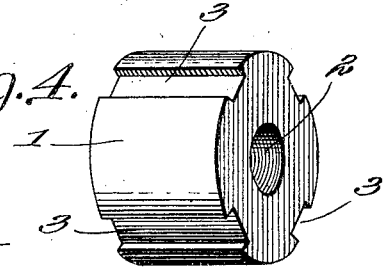
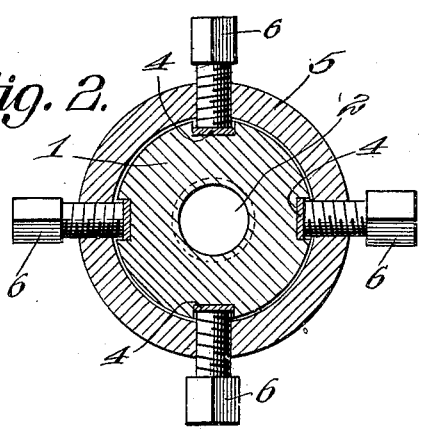
Charles O. Strutz, Inventor.
Witnesses No. 770,399. Patented September 20, 1904.

UNITED STATES PATENT OFFICE.

CHARLES OSCAR STRUTZ, OF WASHINGTON, MISSOURI.

MANDREL FOR PIPE-SHELLACKING MACHINES.

SPECIFICATION forming part of Letters Patent No. 770,399, dated September 20, 1904.

Application filed February 19, 1904. Serial No. 194,352. (No model.)

*To all whom it may concern:*

Be it known that I, CHARLES OSCAR STRUTZ, a citizen of the United States, residing at Washington, in the county of Franklin and State of Missouri, have invented a new and useful Mandrel for Pipe-Shellacking Machines, of which the following is a specification.

This invention relates to improvements in machines for the manufacture of pipes, and particularly relates to machines used in the manufacture of pipes from corncobs.

In the manufacture of corncob pipes as usually practiced the several operations, including the boring, turning, filling, scouring, shellacking, and finishing, the material is manipulated by hand and the operations are comparatively slow and expensive. In order to economize in labor and time in the manufacture of these pipes, I have devised a number of automatic mechanisms for carrying on the several operations, said mechanisms being illustrated and described in certain Letters Patent in the United States granted to me as follows—to wit, No. 740,604, dated October 6, 1903, No. 743,345, dated November 3, 1903, and No. 743,587, dated November 10, 1903, in all of which machines the bored pipe-blanks are arranged on mandrels and subjected to the several cutting and other operations necessary for the manufacture of pipes on a commercial scale.

Owing to the difference in size of the cobs from which the pies are to be made it is necessary to make the bores of different diameter, and this has generally necessitated the employment of mandrels of different size in order to accommodate the different diameters of the bores.

In carrying out the present invention the principal object is to provide a mandrel in which the pipe may be firmly held and in which the mandrel is so constructed as to receive and hold pipes having bores of any diameter.

A further object of the invention is to provide a novel construction of pipe-mandrel in which a plurality of spring-fingers are arranged to receive the pipe and in which provision is made for adjusting and centering the fingers and finger-supports by the set-screws used for locking the fingers in position.

With these and other objects in view, as will more fully hereinafter appear, the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is an elevation of a pipe-mandrel constructed in accordance with the invention. Fig. 2 is a transverse sectional view of the same on the line 2 2 of Fig. 1. Fig. 3 is a detail perspective view of the ring of the mandrel detached. Fig. 4 is a similar view of the internally-threaded collar having grooves for the reception of the spring-fingers. Fig. 5 is a detail perspective view of one of the spring-fingers detached.

Similar numerals of reference are employed to indicate corresponding parts throughout the several figures of the drawings.

In the drawings, 1 designates a metallic collar, having a centrally-disposed threaded opening 2 for the reception of a threaded end of a spindle, head-stock, or like movable part by which the mandrel and pipe are rotated. In the periphery of this collar are cut a number of recesses or slots 3, that extend in a direction parallel with the axis of the collar for the full width thereof, and said recesses are of any desired number and preferably arranged at equidistant intervals. In the recesses are arranged the inner ends of inherently-elastic spring-strips 4 of a width corresponding approximately to the width of the recesses, so as to fit snugly therein, and the outer free ends of the springs extend on converging lines toward a common point which intersects the axial line of the collar. Between the point of connection of the springs with the collar and the point of greatest divergence the springs are bent inward in order to increase their elasticity and to permit their binding more firmly against the bore of the pipe. Surrounding the collar is a clamping-ring 5, the internal diameter of which is but slightly larger than the external diameter of the collar, so as to permit of the ready insertion of the collar and the springs which it carries. This collar is provided with radially-disposed threaded openings of a number equal to the number of springs and adapted to receive set-screws 6, which may be turned until they engage against the springs 4 and are firmly seated in the recesses, while the binding effect of the screws is transmitted to the collar, and the several members are thus rigidly and firmly secured together, while independent rotative movement of either the ring or collar is prevented by making the recesses of a depth a trifle greater than the springs, so that should there be any undue strain the set-screws will come into contact with the side walls of the recesses and further independent rotative movement will be impossible. This construction, further, is such that there is no possibility of the screws moving from contact with the springs should there be any tendency of independent rotative movement, and the parts will always be held in the position to which they are adjusted.

In a device of this character it is possible to use a single mandrel for pipes having bores of any ordinary diameter, and this effects a considerable saving in the construction of machines used for this class of work.

The mandrel forming the subject of the present invention is intended principally for use in connection with machines for applying shellac to pipes and for machines used for white-scouring and other pipe-finishing purposes.

Having thus described the invention, what is claimed is—

In a mandrel for holding pipes, a collar having a central opening for the reception of a spindle or support and provided with a plurality of circumferentially-disposed recesses, springs disposed within the recesses and of a thickness less than the depth of such recesses, the free ends of said springs serving to hold the pipe by outward movement against the wall of the tobacco-well, a ring encircling the collar and provided with a series of threaded openings, and set-screws extending through the threaded openings, one against each spring, the ends of the screws entering the circumferentially-disposed recesses and thereby preventing independent rotative movement of the collar, substantially as specified.

In testimony that I claim the foregoing as my own I have hereto affixed my signature in the presence of two witnesses.

CHARLES OSCAR STRUTZ.

Witnesses:
J. L. CALVIN,
WALTER J. STUMPE.